United States Patent [19]

Buchanan, Jr. et al.

[11] Patent Number: 4,606,440

[45] Date of Patent: Aug. 19, 1986

[54] VEHICLE DAMPING APPARATUS WITH SIMULTANEOUS BLEED ORIFICE AND BLOWOFF CONTROL

[75] Inventors: Harry C. Buchanan, Jr., Spring Valley; Wayne V. Fannin, Xenia; Byron L. Watson, Beavercreek, all of Ohio

[73] Assignee: General Motors Corporation, Detroit, Mich.

[21] Appl. No.: 681,137

[22] Filed: Dec. 13, 1984

[51] Int. Cl.[4] .............................................. F16F 9/48
[52] U.S. Cl. ..................................... 188/319; 188/299
[58] Field of Search ............... 188/285, 299, 319, 320; 267/8 R, 34, 64.16

[56] References Cited

U.S. PATENT DOCUMENTS

| | | |
|---|---|---|
| 1,486,381 | 3/1924 | Jaenichen . |
| 2,950,785 | 8/1960 | Patriquin . |
| 3,006,441 | 10/1961 | Bliven et al. . |
| 3,146,862 | 9/1964 | Van Winsen . |
| 3,152,665 | 10/1964 | Dickinson et al. . |
| 3,420,341 | 1/1969 | Keehn ................................. 188/319 |
| 3,528,531 | 9/1970 | Schweller et al. . |
| 3,532,194 | 10/1970 | Jackson ............................... 188/299 |
| 3,677,561 | 7/1972 | McNally . |
| 3,794,309 | 2/1974 | Chrokey et al. ....................... 267/34 |
| 3,827,538 | 8/1974 | Morgan ................................ 188/319 |
| 3,843,107 | 10/1974 | Atkins . |
| 3,937,307 | 2/1976 | de Kock .............................. 188/319 |
| 4,183,509 | 1/1980 | Nishikawa et al. ................. 267/8 R |
| 4,535,877 | 8/1985 | Shimokura .......................... 188/319 |

Primary Examiner—Duane A. Reger
Attorney, Agent, or Firm—Robert M. Sigler

[57] ABSTRACT

Variable damping apparatus of the fluid pumping type includes an adjustable valve. The valve comprises a stationary plate having a bleed orifice and one or more additional orifices opening axially therethrough, each said additional orifice including a blowoff valve, and a rotatable plate having a bleed orifice and an additional orifice opening axially therethrough, the rotatable plate being disposed adjacent the stationary plate to vary orifice communication with rotation. As the rotatable plate is rotated in opposite directions with respect to the stationary plate away from a position of full communication between the bleed orifices of said plates, the communication of the additional orifices of the plates is varied in a different manner in each rotational direction for equal degrees of communication between the bleed orifices. A rotational actuator is provided to position the rotatable plate with respect to the stationary plate and thus simultaneously select a bleed orifice opening and a blowoff characteristic in response to a signal derived from sensed road characteristics in an adaptive ride control.

5 Claims, 23 Drawing Figures

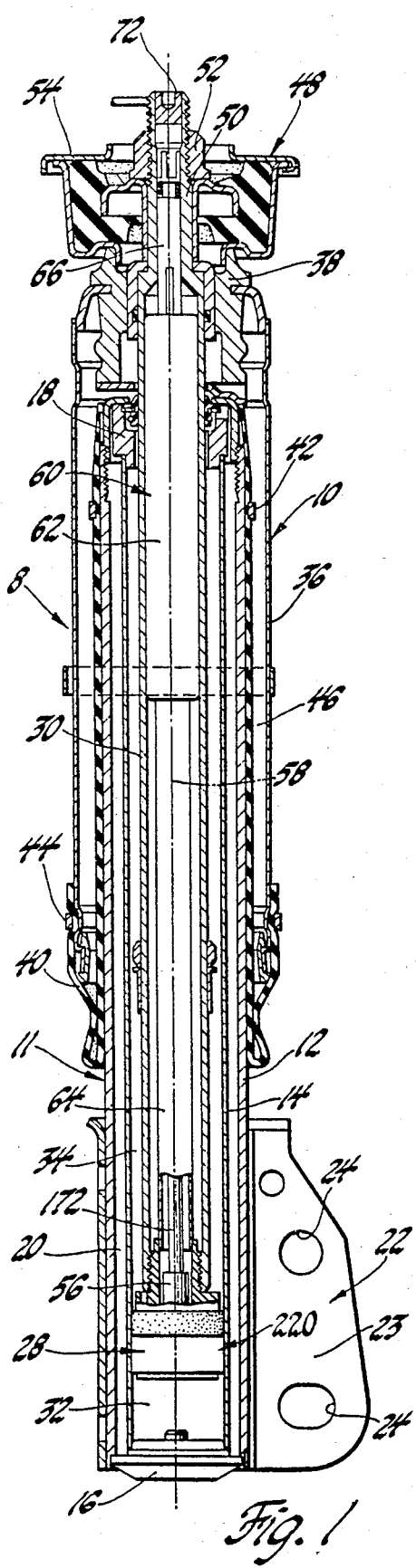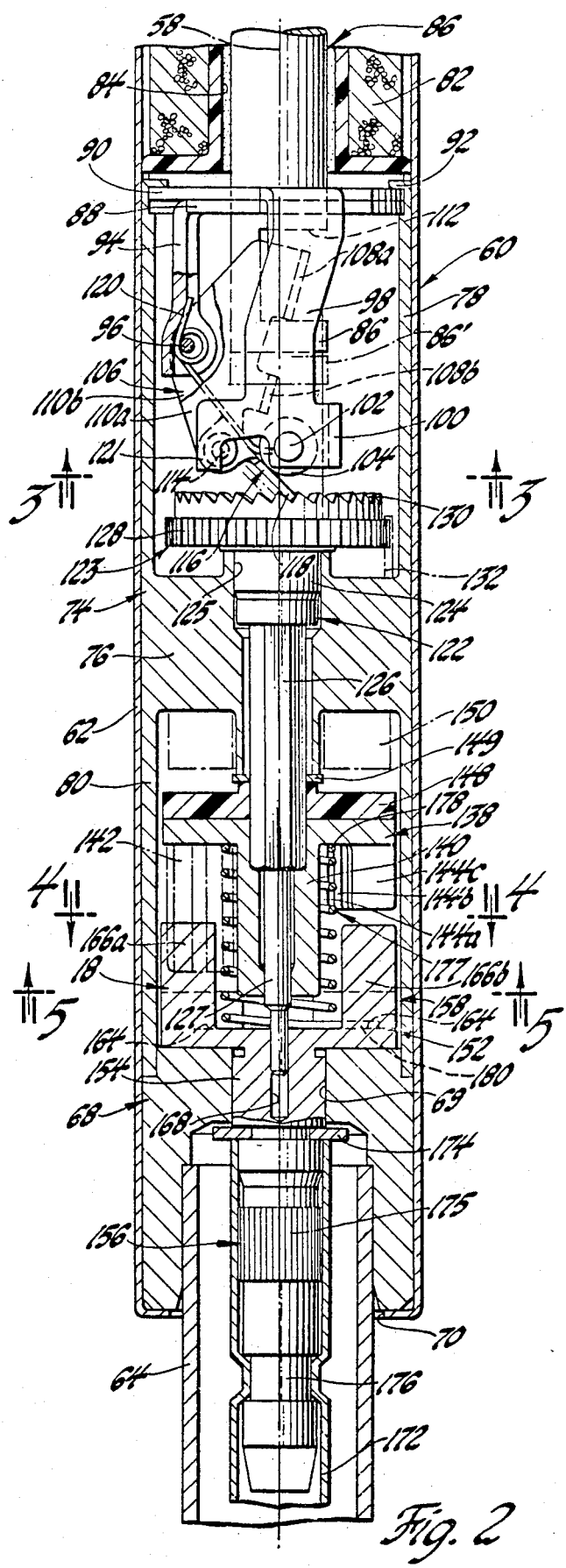

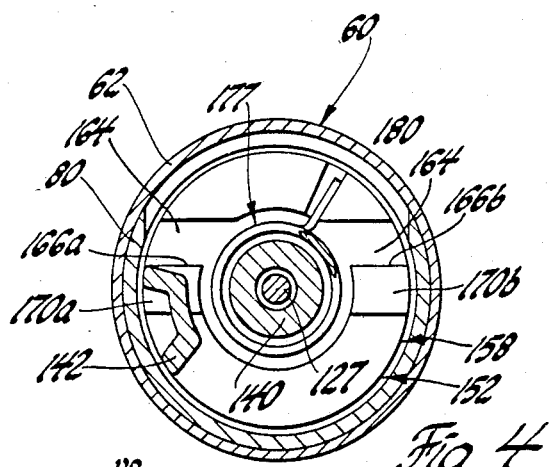
Fig. 4
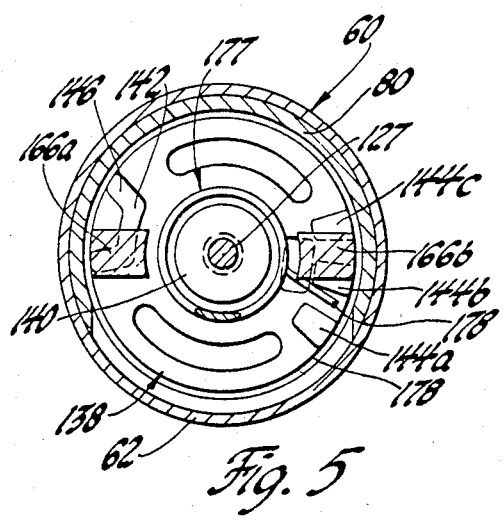
Fig. 5
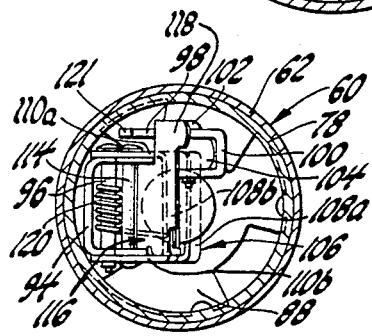
Fig. 3
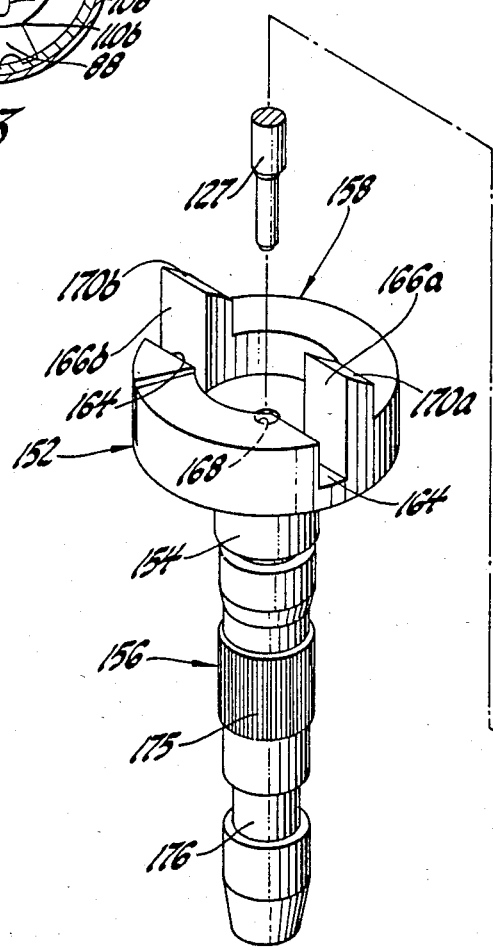
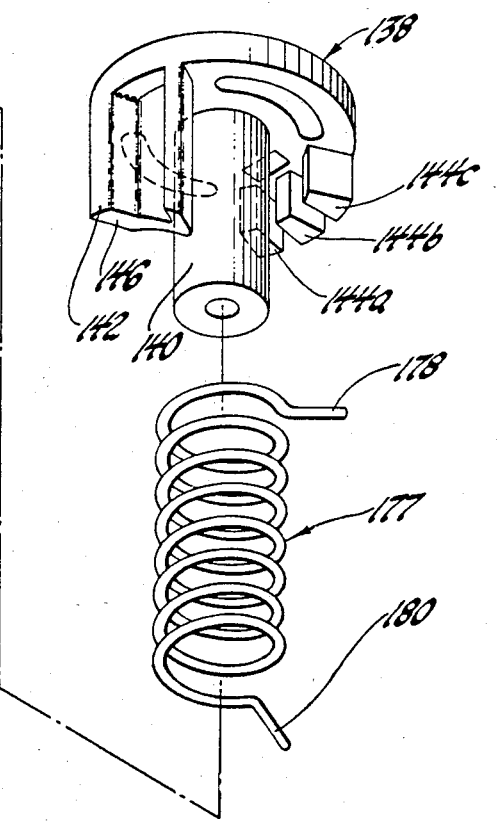
Fig. 6

VEHICLE DAMPING APPARATUS WITH SIMULTANEOUS BLEED ORIFICE AND BLOWOFF CONTROL

BACKGROUND OF THE INVENTION

This invention relates to variable damping apparatus useful for the adjustment of the ride characteristics of a motor vehicle in an adaptive ride control and particularly to a vehicle strut or shock absorber including variable orifice valve apparatus having a single moving valve member effective to simultaneously adjust both a variable bleed orifice and blowoff valve characteristics for a greater variety of pressure-velocity contours and resulting finer control of the vehicle ride characteristics.

There is prior art in the field of strut or shock absorbers showing various configurations of variable bleed orifices which are controlled externally of the shock absorber. A configuration that provides for general simplicity of construction and reliability of operation if correctly designed is that in which a first plate having one or more orifices may be rotated against a stationary plate containing one or more cooperating orifices by means of a rod extending through the shock or strut to a rotating actuator. The orifices in the two plates cooperate in varying the restriction to axial fluid flow through the plates as the first plate is rotated with respect to the second. This serves to make possible a variety of pressure-velocity contours for the device and thus a variety of ride characteristics for the vehicle.

However, in the design of an adaptive ride control system for a motor vehicle, the choice of ride characteristics offered by the variation of the bleed orifice alone may, in many cases, not be sufficient for the particular desired characteristics and wide variety of road surfaces likely to be encountered in vehicle operation. Vehicle shock absorbers are generally provided, in addition to the bleed orifice, with a blowoff valve, which remains closed until pressure builds to a predetermined level and then opens to significantly modify the flow restriction above this pressure from that which would occur in the absence of the blowoff valve. A feature that would add greatly to the possible variations in shock absorber characteristics and thus in vehicle ride characteristics would be the selection of different blowoff valves combined with the variable bleed orifice control. However, for simplicity, cost and reliability of operation, it would be desirable to provide such operation without adding any additional valve parts to the two-plate apparatus described above. To the best of Applicants' knowledge, the prior art shows no examples of variable damping apparatus for motor vehicle ride control providing such desirable features or apparatus.

SUMMARY OF THE INVENTION

It is therefore an object of this invention to provide variable damping apparatus for a wheeled vehicle providing simultaneous adjustment of both bleed orifice and blowoff valve characteristics for a greater variety of different, selectable ride control characteristics of the vehicle.

It is a further object of this invention to provide such apparatus wherein the selection is obtained by rotating a single rotatable member adjacent a stationary member, the members having cooperating orifices allowing axial flow of fluid therethrough for simplicity of construction and reliability of operation.

These objects are obtained in a variable damping apparatus for a wheeled vehicle having sprung and unsprung masses, the damping apparatus having a housing defining a pair of chambers connected by a conduit and containing a non-compressible fluid, means effective to pump the fluid between the chambers through the conduit in response to vertical movement between the sprung and unsprung masses, valve means in the conduit and valve adjustment means, the valve adjustment means comprising a stationary plate in the conduit having a bleed orifice and one or more additional orifices opening axially therethrough, each of the additional orifices having a blowoff valve closed at low pressure and opening at a higher pressure and a rotatable plate adjacent the stationary plate with a bleed orifice and an additional orifice so positioned relative to each other and to the orifices of the stationary plate that, as the rotatable plate is rotated with respect to the stationary plate in opposite directions away from a position of full communication between the bleed orifices, the communication of the additional orifices of the plates is varied in a different manner in each rotational direction for equal degrees of bleed orifice communication, the rotatable plate being rotated by the valve adjustment means to simultaneously vary the bleed orifice communication and the blowoff characteristics. The variation of blowoff characteristics may be a variation of communication between orifices in the two plates or a change to a different orifice in the stationary plate having a different opening area, a different blowoff pressure or both.

Further details and advantages of this invention will be apparent from the accompanying drawings and following description of the preferred embodiment.

SUMMARY OF THE DRAWINGS

FIG. 1 is a partially broken away elevational view of a variable damping apparatus for a motor vehicle.

FIG. 2 is an enlarged, partially broken away view of a portion of FIG. 1 showing a rotary actuator for use in the variable damping apparatus of FIG. 1.

FIG. 3 is a reduced view taken generally along the plane indicated by lines 3—3 in FIG. 2.

FIG. 4 is a sectional view taken generally along the plane indicated by lines 4—4 in FIG. 2.

FIG. 5 is a sectional view taken generally along the plane indicated by lines 5—5 in FIG. 2.

FIG. 6 is an exploded perspective view of a portion of the rotary actuator shown in FIG. 2.

DESCRIPTION OF THE PREFERRED EMBODIMENT

Environment of the Invention

Figure 7:
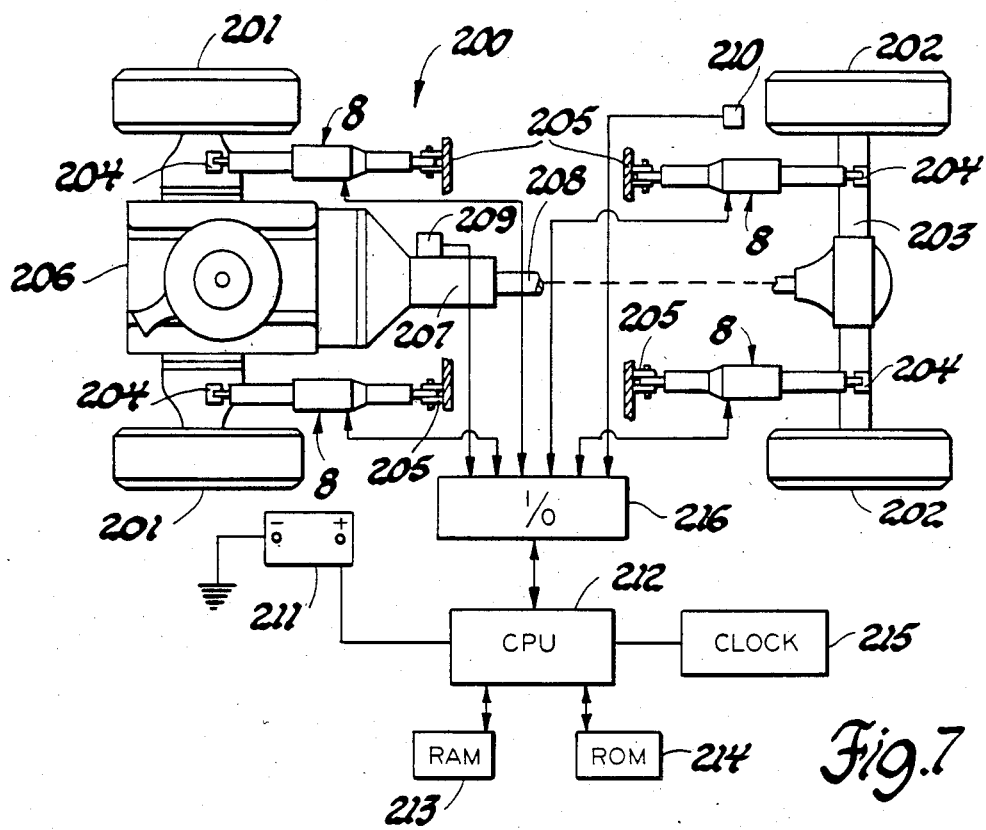
FIG. 7 is an overall schematic view of a wheeled motor vehicle having an adaptive ride control system including the variable damping apparatus of FIG. 1.

Referring to FIG. 7, a wheeled motor vehicle 200 has an unsprung mass comprising front wheels 201 with their associated unsprung suspension components, rear wheels 202 and rear axle and differential assembly 203. The remainder of the vehicle 200 is sprung mass, which is supported, in this embodiment, by apparatus including four strut type, hydraulic, variable dampers 8, each of which is attached to the unsprung mass as shown at 204 and to the sprung mass as shown at 205.

Vehicle 200 has an engine 206, transmission 207 and drive shaft 208 effective to drive the rear wheels 202 through the rear axle and differential assembly 203, although the invention is not limited to rear drive vehicles or this precise configuration. Vehicle 200 further includes a vehicle road speed sensor 209 and a relative position sensor 210 for the sprung and unsprung masses, both of which sensors will be described in more detail at a later point in this description. Battery 211 symbolizes the vehicle electric power source, which includes generating and voltage regulating apparatus not shown and provides electric power at a regulated voltage to control apparatus comprising central processing unit (CPU) 212, random access memory (RAM) 213, read only memory (ROM) 214, clock 215 and input/output (I/O) apparatus 216, the last of which includes interfacing circuitry between CPU 212 and the sensing and actuating apparatus of the system. Elements 212–216 are common microcomputer elements and may comprise, for example, a Motorola 6801 (R) microprocessor with appropriate support chips. I/O apparatus 216 receives pulses from road speed sensor 209 and generates an interrupt in CPU 212 for each such pulse. It also receives a signal from relative position sensor 210 and a rotational position signal from each variable damper 8, converts them from analog to digital form if required, and holds them to be read by CPU 212. Finally, it generates power pulses for the actuators of variable dampers 8 in response to signals from CPU 212.

Struts

Referring to FIG. 1 of the drawings, a strut type, hydraulic, variable damper 8 of the load leveling variety includes a height adjusting portion 10 and a damper portion 11. The damper portion 11 includes an outer cylindrical tube 12 and a fluid filled inner cylindrical tube 14 rigidly connected to the outer tube at the lower end of the damper by a base valve 16 and at the upper end of the damper by a bearing and seal assembly 18 with an annular reservoir 20 being defined between the inner and outer tubes. A bracket 22 is rigidly attached to the outer tube 12 at the lower extremity of the damper and includes a flange 23 with a pair of apertures 24 whereby the damper is suited for bolt attachment to a portion of the vehicle unsprung mass such as a wheel spindle or steering knuckle assembly, as indicated generally at 204 in FIG. 7. A piston assembly 28 is slidably disposed in the inner tube 14 and is rigidly connected to a hollow piston rod 30 which slidably and sealingly projects through the bearing and seal assembly 18, the piston dividing the fluid filled interior of the inner tube 14 into a compression chamber 32 between the piston and the base valve 16 and an annular rebound chamber 34 around the piston rod 30 between the piston and the seal assembly 18.

The height adjusting portion 10 includes a rigid sleeve 36 sealingly connected at its upper end to an annular member 38 which, in turn, is rigidly attached to the upper end of the hollow piston rod 30. A flexible sleeve 40 surrounds the outer tube 12 and is sealingly clamped thereagainst at the upper end of the outer tube by a band 42. The flexible sleeve 40 extends down along the outer tube and below the lower end of rigid sleeve 36 and is then folded back over the rigid sleeve 36 and clamped to the lower end of the latter by a band 44 so that an air chamber 46 is defined between the sleeves 36 and 40. Conventional valve means, not shown, on the rigid sleeve 36 admit pressurized air to the chamber 46 to adjust the normal or rest height of the sprung mass of vehicle 200.

For attaching the damper 8 to the vehicle sprung mass, a seat assembly 48 is disposed around a reduced stem portion 50 of the piston rod 30 and is clamped against the member 38 by a nut 52. A flat surface portion 54 of the seat assembly 48 is adapted for seating against a corresponding surface on the sprung mass portion of the vehicle, as indicated generally at 205 in FIG. 7, and for rigid attachment thereto, as by bolting. Accordingly, when the seat assembly 48 is thus attached to the sprung mass portion of the vehicle and the flange 23 is attached to the unsprung mass portion, the piston assembly 28 reciprocates within the inner tube 14 during suspension excursions while air in the pressure chamber 46 assists in supporting the sprung mass on the unsprung mass. It will be understood that additional resilient supporting means such as coil or leaf springs are provided for the support of the sprung mass and that they could be replaced or supplemented, along with the height adjusting portion of damping apparatus 10, by a pneumatic suspension within the scope of this invention. The height adjusting portion of the suspension is not necessary for this invention.

The piston assembly 28 cooperates with the foot valve 16 in known fashion to damp suspension excursions of the unsprung mass relative to the sprung mass. Generally, during a jounce or intake excursion, the piston assembly 28 is forced down in the inner tube 14 while valving on the piston assembly permits relatively unobstructed passage of fluid from the compression chamber 32 into the rebound chamber 34. Concurrently, a volume of fluid corresponding to the increasing volume of the piston rod 30 within the inner tube 14 escapes to the reservoir 20 through foot valve 16. Conversely, during a rebound suspension excursion, the piston assembly 28 moves up in the inner tube 14 while valving in the piston assembly throttles fluid thereacross from the rebound chamber 34 to the compression chamber 32, the foot valve 16 concurrently permitting fluid migration from the reservoir 20 to the compression chamber 32 to compensate for the reduced volume of the piston rod 30 within the inner tube. The piston assembly 28 includes a rotor 56 supported on the assembly for rotation about a longitudinal axis 58 of damper 8.

The rotor 56 is rotatable through a plurality of control positions wherein different valves or combinations of valves on the piston are activated to provide different damping capabilities. An actuator 60 is disposed within the piston rod 30 and operates to rotate the rotor 56 between its control postions in accordance with electronic signals from the control comprising elements 212–216.

As seen best in FIGS. 1 and 2, the actuator 60 includes a cylindrical housing 62 having an outside diameter corresponding generally to the inside diameter of the piston rod 30, an outer tube 64, and a connector tube 66. A cylindrical shaft support 68 having a bore 69 therethrough is disposed in the housing 62 at the lower end thereof and receives the upper end of outer tube 64 through an aperture 70 in the lower end of the housing 62 whereby the outer tube is rigidly attached to the shaft support and to the housing. The lower end of the outer tube is connected by conventional means to the piston assembly 28 so that the housing 62, the outer tube 64, and the piston assembly 28 form a rigid unit. The connector tube 66 is likewise rigidly connected to the housing 62 and projects up through the center of the reduced stem portion 50 of the piston rod to an electrical connector 72 whereat terminals, not shown, are provided for electrically connecting the actuator 60 to control 212–216. Because the piston rod 30 is attached to the seat assembly 48 which, in turn, is attached to the sprung mass portion of the vehicle, the actuator 60 and the connector 72 remain stationary relative to the sprung mass portion as the inner and outer tubes 12 and 14 reciprocate vertically relative to the piston assembly 28 during suspension excursions.

Piston Assembly Valves

Figure 9:
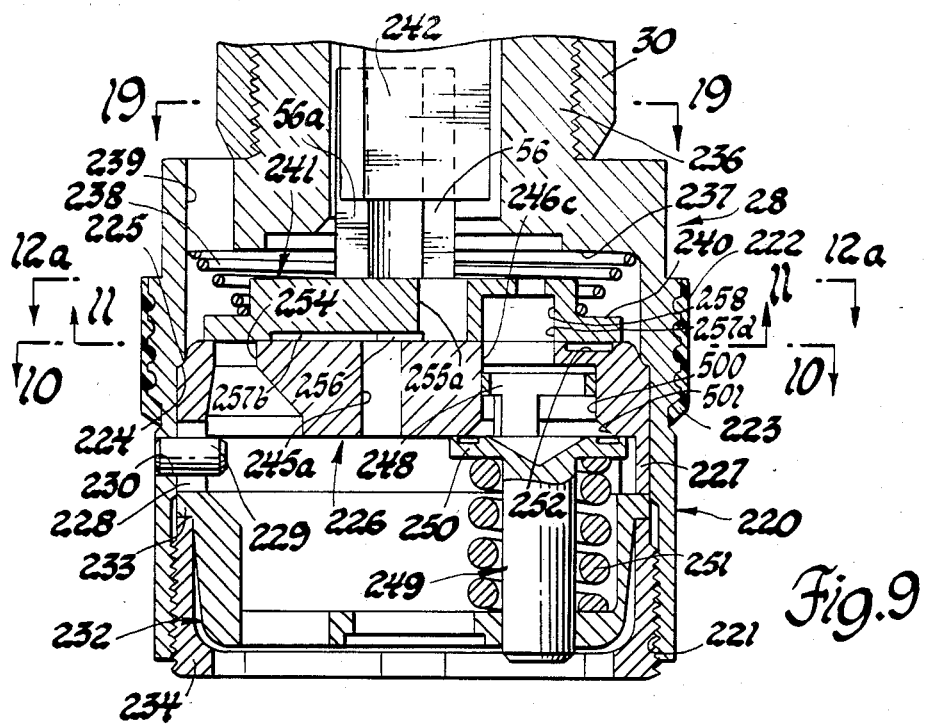
FIG. 9 is a cutaway side elevational view of valve apparatus for use in the variable damping apparatus of FIG. 1.

FIG. 9 shows a cutaway view of piston assembly 28. Piston 220 is generally cylindrical in shape with an open, internally threaded lower end 221 and a seal mounting section 222 about two-thirds of the way up in FIG. 9, around which is fitted an annular seal 223. Piston 220 further has an internal land 224, against which rests a peripheral land 225 of an orifice plate 226. Orifice plate 226 further has a downwardly extending annular wall 227 with an axially extending slot 228 in one side thereof. A retaining pin 229 driven flush through an opening 230 in piston 220 and through slot 228 holds orifice plate 226 stationary against rotation. A retainer cage 232 has a radially outwardly extending upper flange 233 sandwiched between the lower end of wall 227 of orifice plate 226 and an externally threaded piston nut 234, the threads of which engage the internal threads at the lower end of piston 220. This arrangement locks piston nut 234, retainer cage 232 and orifice plate 226 axially against internal land 224 within internally threaded lower end 221 of piston 220.

Figure 19:
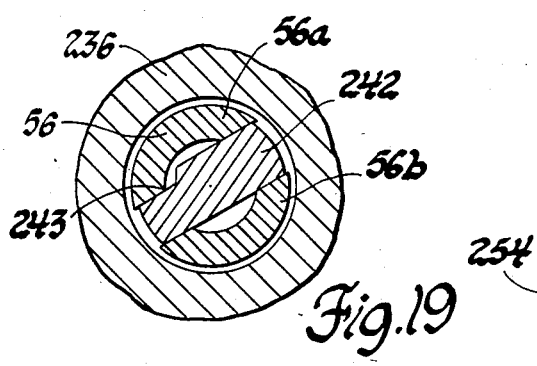
FIG. 19 is a section view along lines 19—19 in FIG. 9.

FIG. 9 shows just enough of a central axially upwardly extending portion 236 of piston 220 to show that it is externally threaded and engages the lower, internally threaded end of hollow piston rod 30. Below this in the figure is shown a broad internal land 237 which serves as a base for an intake spring 238 and further includes axial openings 239 connecting the interior of piston assembly 28 to rebound chamber 34. The other end of intake spring 238 engages a peripheral flange 240 of a selector plate 241 and biases selector plate 241 axially against orifice plate 226. Selector plate 241 is rotatable within piston assembly 28 and includes rotor 56 projecting axially upward therefrom. Rotor 56 comprises a pair of driving members 56a and 56b. As seen more particularly in FIG. 19, driving members 56a and 56b have an arcuate cross-section and are relatively positioned to define an annulus having a slot therethrough. A driver blade 242 attached to actuator apparatus yet to be described projects axially downward into the slot to engage driver members 56a and 56b for the rotation of selector plate 241. A stepped down portion 243 of driver blade 242 ensures the proper orientation of driver blade 242 within the slot, as seen in FIG. 19.

Figure 10:
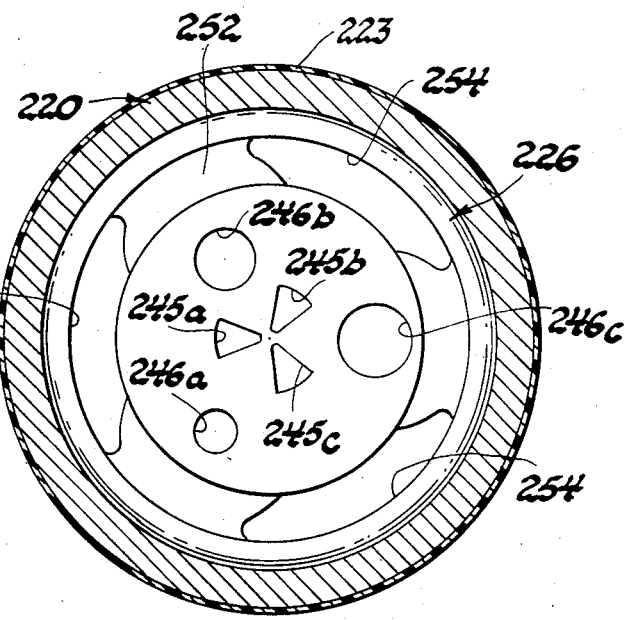
FIGS. 10 and 11 are sectional views looking in opposite directions along a common plane indicated by lines 10—10 and 11—11 in FIG. 9.

FIG. 10 shows a top view of orifice plate 226. Toward the center of the plate are three pie-shaped (that is, shaped like cut sectors of a circular pie) orifices 245a, 245b and 245c, which comprise bleed orifices extending axially through the plate for communication with compression chamber 32. Orifices 245a–245c are identical in size and shape in this embodiment, although they need not be in all embodiments. In addition, they are symmetrical about axes extending radially 120 degrees apart from each other from the center of orifice plate 226. Radially outward of pie-shaped orifices 245 and interspersed therebetween are blowoff orifices 246a, 246b and 246c, which also extend through the plate for communication with compression chamber 32.

Blowoff orifices 246a–246c are not necessarily of uniform diameter through orifice plate 226. In the embodiment shown, blowoff orifice 246c widens to an intermediate portion 500 and again to a lower opening 501. Intermediate portion 500 retains the upper aligning portion 248 of a valve member 249 having a sealing flange 250 which is biased against the bottom of orifice plate 226 by a valve spring 251 anchored in retainer cage 232. Lower opening 501 defines the blowoff pressure area of valve member 249 which, together with the spring constant of valve spring 251, determines the blowoff pressure for the valve. Blowoff orifices 246a–246c may be provided with differing restrictions to fluid flow by means of different opening areas or other design features; and they may also be provided with differing blowoff pressures by means of different spring factors in the valve springs 251.

The peripherally outermost portion of the upper surface of orifice plate 226 is provided with an annular depression 252 to help lessen friction between orifice plate 226 and selector plate 241. In addition, opening from depression 252 are a plurality of intake restrictions 254 which communicate through orifice plate 226 to compression chamber 32 but are sealed at their upper end by selector plate 241 at all times except when selector plate 241 itself is moved axially away from selector plate 226 against intake spring 238 by the force of fluid during an intake stroke. In other words, intake restrictions 254 are intake blowoff orifices through orifice plate 226; whereas blowoff orifices 246a–246c are rebound blowoff orifices. It will be apparent that the variation in blowoff characteristics as described for this preferred embodiment is available only for rebound, although it would be apparent to one skilled in the art that similar principles could be applied to the design of apparatus having variation of blowoff characteristics in intake or jounce. As a practical matter, the variation of blowoff characteristics in rebound only has been found to be entirely adequate for an adaptive ride control. Bleed orifices 245a–245c function and help provide control of bleed orifice communication during both intake and rebound.

Figure 11:
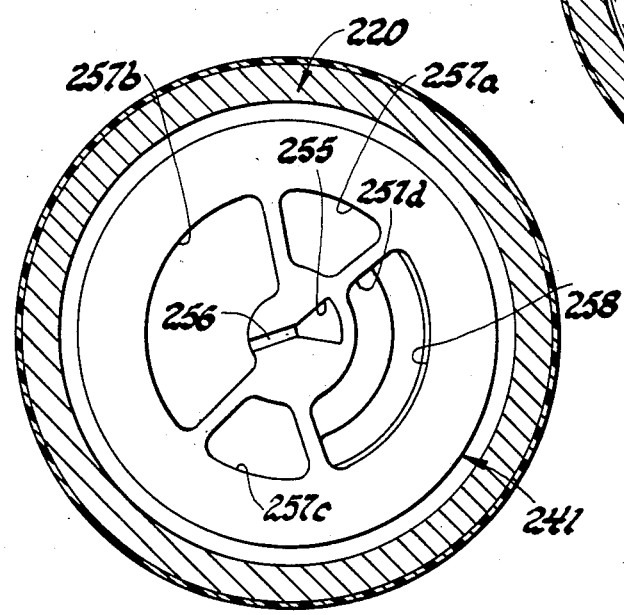

FIG. 11 shows a view of the bottom surface of selector plate 241. Selector plate 241 is provided with a single pie-shaped bleed orifice 255 which is similar in size, shape and radial position to the pie-shaped orifices 245a-c of the orifice plate 226. As selector plate 241 is rotated adjacent orifice plate 226, orifice 255 of selector plate 241 communicates with each of the orifices 245a-245c of orifice plate 226 in turn. There is a position for each of the orifices 245a-245c in which it is perfectly aligned with orifice 255 for full communication, i.e. the maximum bleed orifice opening, between the two plates. Rotation of selector plate 241 from that position in either direction reduces the bleed orifice communication. There is also a small extension 256 of orifice 255 in a direction 180 degrees therefrom, as seen in FIG. 11, which will align with one of the orifices 245a-245c in orifice plate 226 when orifice 255 does not align with any of those orifices. This provides a minimum bleed orifice through the plates at all times.

Selector plate 241 has on its lower surface a plurality of depressions 257a-257d for the reduction of friction between the plates. These depressions, if joined together, would create a generally annular depression; however, they are separated as shown in FIG. 11. One of the depressions, depression 257d in FIG. 11, opens into an orifice 258 in the shape of an annular sector which is carefully angularly positioned and sized with respect to orifice 255 so that, as selector plate 241 is rotated in one direction away from a position of full bleed orifice communication between the plates, orifice 258 communicates with one of the orifices 246a-246c in orifice plate 226; but if selector plate 241 is rotated in the other direction from the same position of full bleed orifice communication, orifice 258 first reduces communication with the one of orifices 246a-246c and then begins communication with a different one of orifices 246a-246c.

Figure 12A:
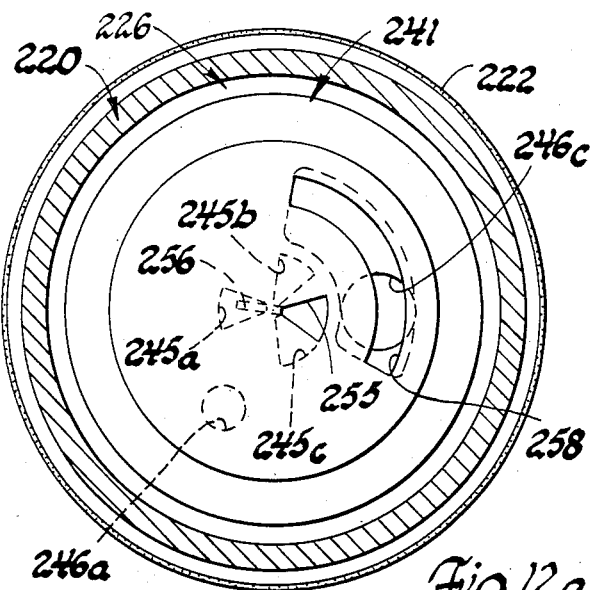
FIGS. 12a–12e are sectional views taken generally along the plane indicated by lines 12a—12a in FIG. 9 and showing the valve apparatus in varying rotational positions.
Figure 12B:
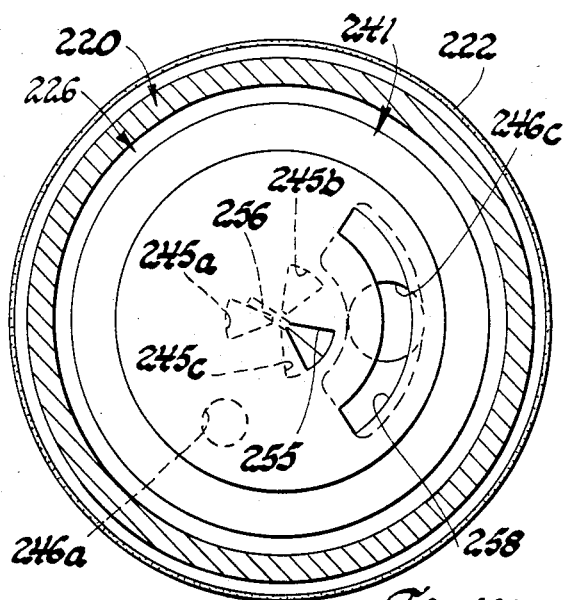
Figure 12C:
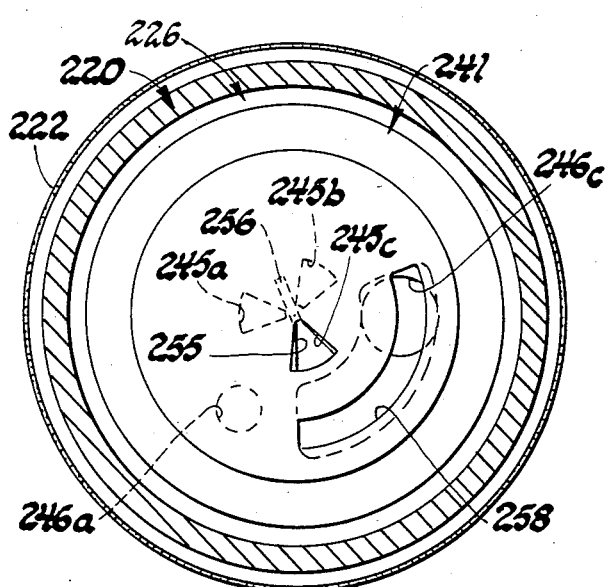
Figure 12D:
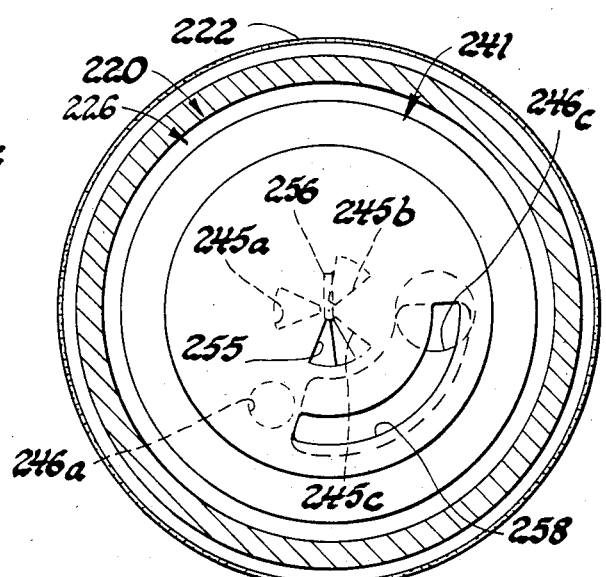
Figure 12E:
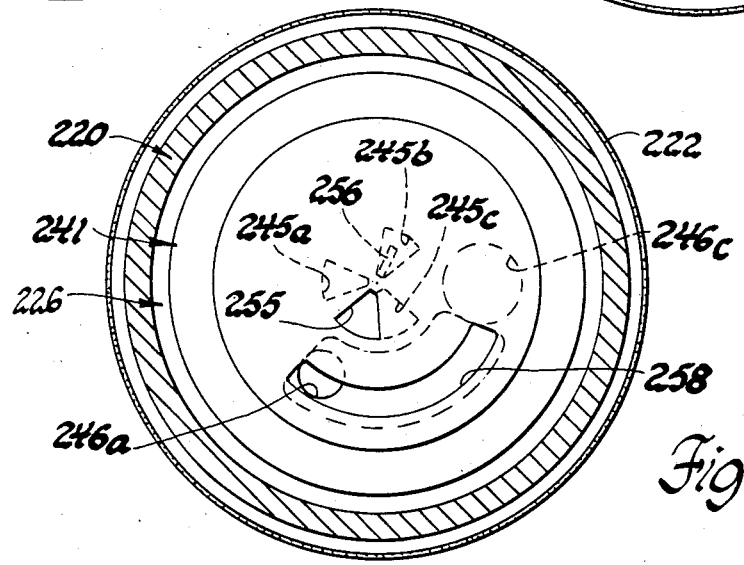

The preceding statement may be illustrated by reference to FIGS. 12a-12e, in which successive positions of the selector plate 241 are shown as it is rotated from one position of minimum bleed orifice communication through a position of full bleed orifice communication and into another position of minimum bleed orifice communication for the bleed orifice 245c. Referring to FIG. 12c, the plates are shown in a position of full bleed orifice communication wherein orifice 255 is aligned symmetrically with orifice 245c. It can be seen that orifice 258 of selector plate 241 is in full communication with orifice 246c of orifice plate 226. Moving backward through FIGS. 12b and 12a, the bleed orifice communication between orifices 255 and 245c decreases but orifice 258 of selector plate 241 remains in full communication with orifice 246c of orifice plate 226. On the other hand, as one proceeds from FIG. 12c through FIG. 12e, the decrease in bleed orifice communication is identical because of the symmetry of the bleed orifices; but orifice 258 now begins to decrease its communication with blowoff orifice 246c and increase communication with blowoff orifice 246a. In the embodiment shown, this will produce blowoff characteristics associated with blowoff orifice 246c with rotation in one direction and a reduction in communication of blowoff orifice 246c and a shift to the characteristics of blowoff orifice 246a with rotation in the other direction. With an actuator capable of accurately positioning selector plate 241 rotationally with respect to orifice plate 226 among a plurality of predetermined positions such as those shown in FIGS. 12a-12e, a plurality of differing pressure-velocity characteristics may be obtained which combine a selection of bleed orifice communication with a further selection of blowoff characteristics. In addition, there are many variations of the general principle possible which would be obvious to one skilled in the art after a careful examination of this specification. The sector length of the orifice 258 and relative positions of the blowoff orifices 246a-246c may be varied for a further variety of effects. For example, either of the blowoff variations described above—(1) reduction in blowoff orifice restriction by reducing communication or (2) change in blowoff pressure or orifice restriction by changing orifices—may be used by itself. In addition, movement in one direction may communicate a single blowoff valve while movement in the opposite direction may communicate two or more valves, one of which may be the same valve as in the first direction. Many variations and combinations will occur to designers. Naturally, geometry places some restrictions on the possibilities where three blowoff orifices 246a-246c are desired. If only two blowoff orifices such as 246a and 246c, are required, then only one bleed orifice 245c is required and there are a great number of possible arrangements. The larger number of blowoff orifices 246a-246c limits somewhat the geometrical possibilities but adds a third set of blowoff characteristics.

Figure 15:
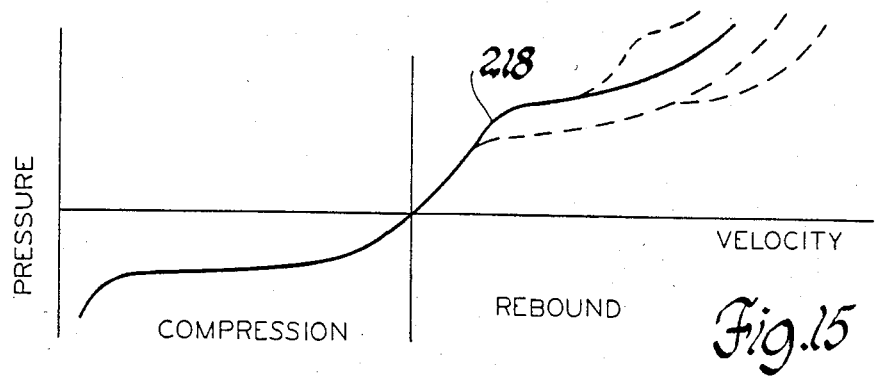
FIG. 15 is an illustrative pressure-velocity contour diagram for one embodiment of a variable damping apparatus of the type shown in FIG. 1.
Figure 18:
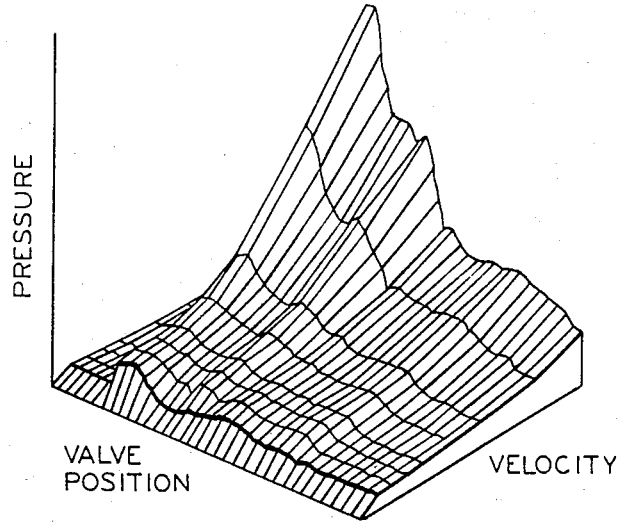

Just a few of the possibilities in variation of the pressure-velocity characteristics of the damping apparatus are shown in FIG. 15. A single typical pressure-velocity contour is shown as the solid line of FIG. 15 which indicates, in both the compression and rebound directions, a gradual increase in pressure with velocity until a knee is encountered at the point where the blowoff valve opens and the pressure starts increasing at a lesser rate. Knee 218 is identified for rebound. Adjustment of the bleed orifice alone changes the entire curve at once and produces its most significant effect between the origin and the knee. This restricts control of the vehicle ride characteristics. The dashed lines of FIG. 15 show various possibilities in changes of blowoff characteristics by means of this invention for the same bleed orifice area. Naturally, with differing bleed orifices producing different shapes of the contour below the knee, the possibilities will be increased even over those shown in FIG. 15. FIG. 18 shows a possible array of pressure-velocity contours for a valve as described herein with an actuator capable of selecting 36 rotational positions.

System Operation

The variable damping devices 8 are employed in an adaptive ride control system for a wheeled vehicle as shown in FIG. 7. The control comprising elements 212-216 samples and digitizes the output of the relative position sensor 210 during a predetermined time period and derives from this information first and second lookup numbers based on the number of road caused oscillations in the vertical separation of sprung and unsprung masses and the maximum range of those oscillations, respectively. These two lookup numbers are used to retrieve a damping contol number from many stored in a lookup table or matrix contained in ROM 214; and the system utilizes the damping control number to command a rotational position for rotatable plate 241 to select the ride characteristics of the vehicle. It is sufficient, for the invention, for an adaptive ride control system to have a single lookup table or matrix; however, the use of multiple tables allows selection of totally different ride control strategies which permits such options as driver selection of overall ride character.

Figure 13:
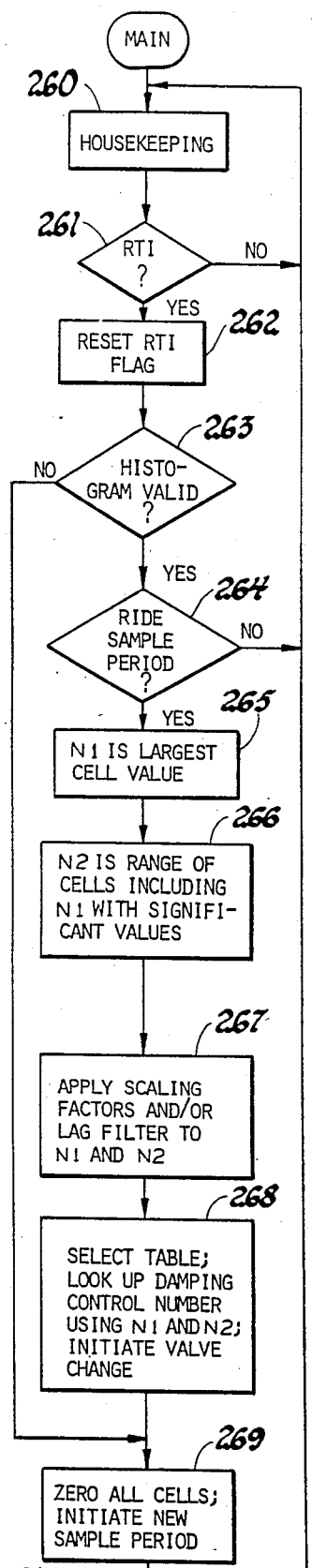
FIGS. 13 and 14 are flow charts describing the operation of the adaptive ride control system for the vehicle of FIG. 7.
Figure 16:
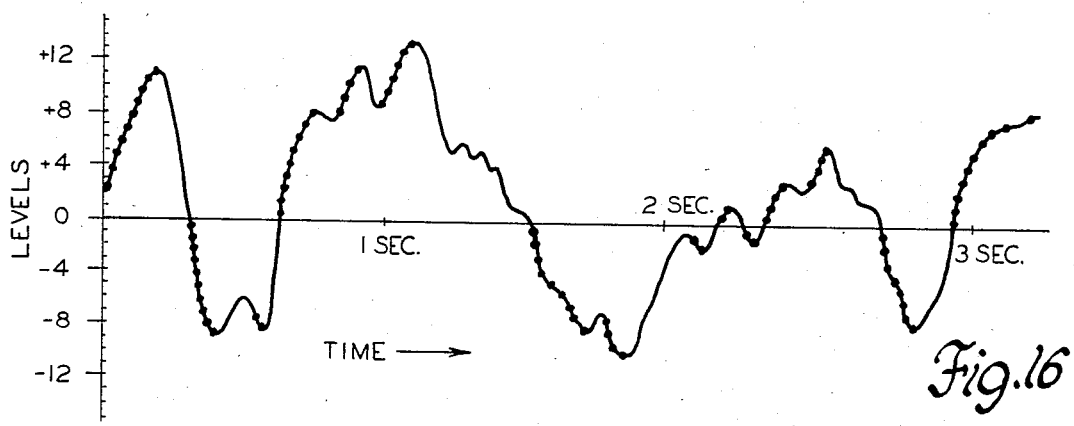
FIGS. 16–18 are illustrative diagrams useful in the description of the operation of the adaptive ride control system of the vehicle in FIG. 7.
Figure 17:
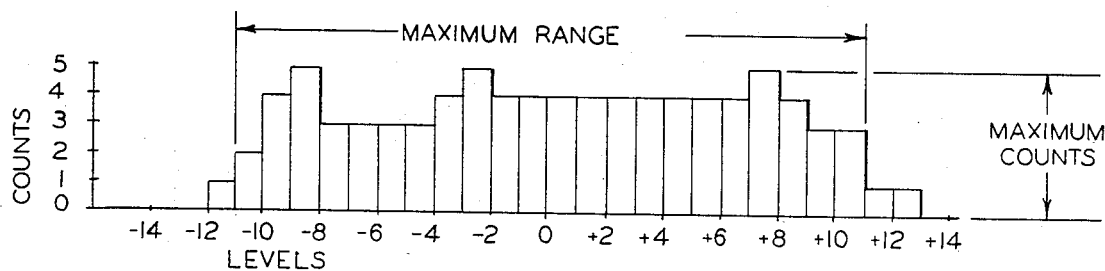

The operation of the system shown in FIG. 7 will be described with reference to the flow charts shown in FIGS. 13 and 14 and the illustrative curves and graphs of FIGS. 16–18. FIG. 13 shows the MAIN control routine which repeats as long as the vehicle is being operated. Step 260 and decision point 261 describe a repeating loop in which the program waits for an interrupt. Block 260, labelled "HOUSEKEEPING", includes system initialization, which occurs only during the first pass after initial startup, in which certain locations in RAM 213 are set to predetermined values, any keep alive memory is validated with predetermined values substituted in case of invalidity and all damping device actuators are commanded to go to predetermined positions. In all passes through this block, however, the system performs other program housekeeping tasks which, where relevant to this invention, will be described. The program spends a large portion of its time in this loop; therefore program functions and calculations which are not immediately necessary in another part of the program and which might slow down the program at a point where speed is desired are postponed to this block. In addition, this block could represent one or more control routines for other functions related or unrelated to vehicle suspension.

In block 261, the system determines, by examining a flag, whether a real time interrupt (RTI) has occured in the last loop. The system has two forms of hardware interrupts: a real time (RTI) interrupt generated internally on the microprocessor chip every 5 milliseconds and a road speed (RDSPD) interrupt generated by the I/O apparatus 216 in response to a pulse from road speed sensor 209. Either interrupt will transfer operation of the system from the MAIN ROUTINE to the INTRPT routine shown in FIG. 14. This transfer occurs, of course, from whereever the system happens to be in the program; and a flag is set only if the interrupt is an RTI interrupt. Thus, only when decision point 261 is encountered after an RTI interrupt does the system advance to step 262 of the MAIN routine. The description of the remainder of the MAIN routine will be clearer if, at this point, the INTRPT routine is described.

Figure 14:
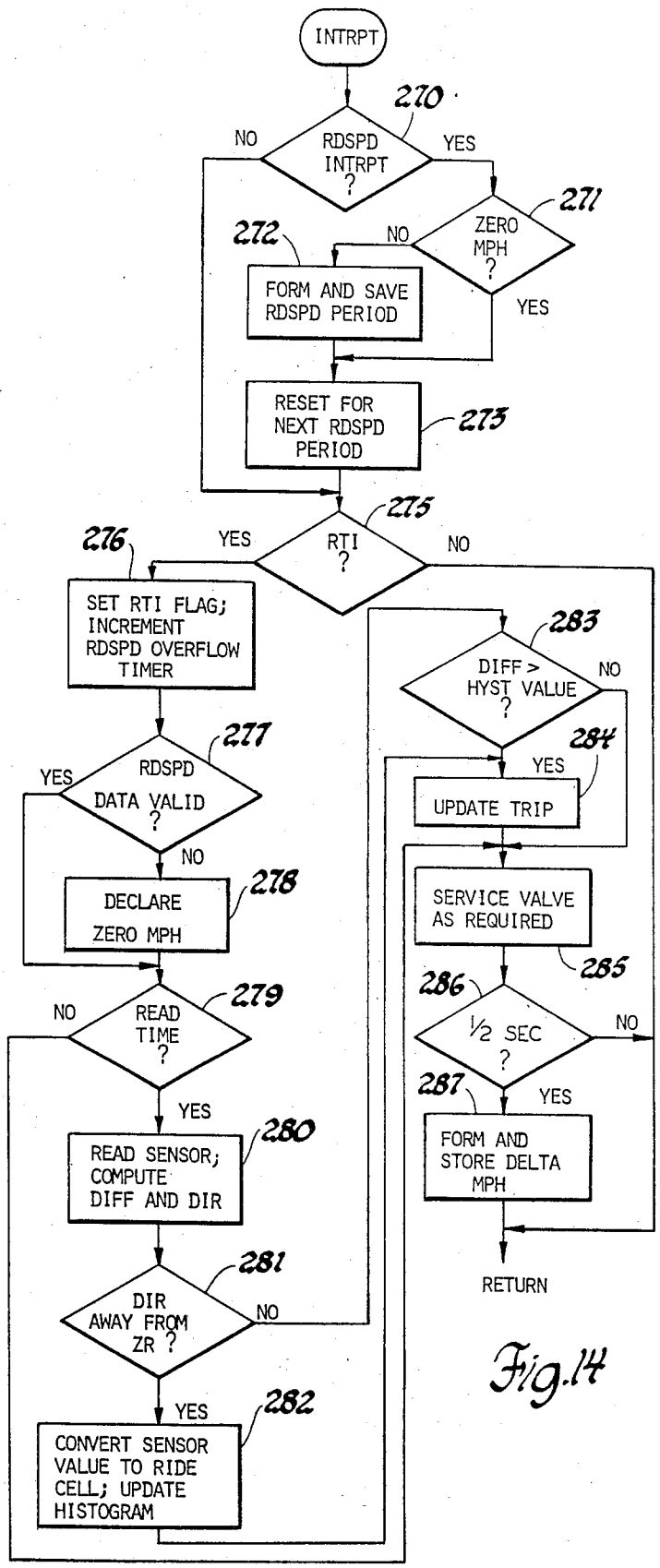

Referring to FIG. 14, the INTRPT routine first determines, at 270, whether or not the interrupt is an RDSPD interrupt, one of which is generated by each pulse from sensor 209. Pulses are generated by sensor 209 at a rate proportional to drive shaft rotation to indicate vehicle speed, which is used in a number of ways in this embodiment. The time between RDSPD interrupts is a measure of the vehicle speed; and it is kept track of in two ways in this embodiment. A hardware timer in CPU 212 provides a high resolution time counter. However, in this embodiment, it overflows in one second and therefore cannot by itself time the longer periods between interrupts achieved during slow vehicle speeds. Thus the RDSPD OVERFLOW TIMER, a software timer to be later described, counts RTI interrupts. Clearly, if the vehicle is at rest, no RDSPD interrupts will be generated. Therefore, when the RDSPD OVERFLOW TIMER counts to a predetermined number it sets a ZERO MPH flag. If the interrupt is determined to be a RDSPD interrrupt, the system checks, at 271, to see if the ZERO MPH flag is set. If the ZERO MPH flag is set, the system assumes no vehicle motion and proceeds to block 273, in which the system is reset for the next RDSPD period. This resetting includes a reset of the ZERO MPH flag itself, as well as the marking of the hardware timer value as the new initial reference time and the clearing of the RDSPD OVERFLOW TIMER. If not, however, the system forms and saves the RDSPD period at 272 before proceeding to 273. This RDSPD period is stored in RAM 213 for processing during the next pass through HOUSEKEEPING block 260.

From step 270, if the interrrupt is not an RDSPD interrupt, or from step 273, the system then proceeds to decision point 275, in which it is determined whether the interrupt is an RTI interrupt. If it is, the system sets the RTI flag and increments the RDSPD OVERFLOW TIMER in step 276. The system next determines, at decision point 277, if the RDSPD data is valid, by comaring the count of the RDSPD OVERFLOW TIMER with a predetermined constant indicative of essentially no vehicle movement. If not valid, the system sets the ZERO MPH flag in step 278 before proceeding to 279. If valid, the system proceeds directly to decision point 279 and determines there whether it is time to read relative position sensor 210. This sensor is read, for example, every 20 milliseconds, which corresponds to every four RTI interrupts. If it is not time to read the ride sensor, the system proceeds to step 285, yet to be described. However, if it is time, at step 280 the system reads the sensor, converts the analog sensor voltage into a digital numerical value, stores the value in RAM and computes and stores the difference (DIFF) between this sensor reading and a value TRIP and the direction (DIR) of this sensor reading from the value TRIP, TRIP being a prior sensor reading retained in RAM as described below.

In the program blocks to be described next, the present sensor value and TRIP are used to update a ride histogram. This histogram comprises a matrix of relative wheel positions versus the number of times each predetermined wheel position is crossed in significant movements during a predetermined time period. This is realized in the computer by the assignment of a series of memory locations in RAM as cells corresponding to a series of wheel positions which span the substantial range of possible wheel positions in ordinary vehicle operation. The center cell is the neutral position and is called cell zero; and there are, for example, 15 cells in each direction from cell zero, each cell representing another standard predetermined increment of wheel travel from the neutral position. Each cell, being a memory location, is capable of storing a number, which number is a count of the sensed occurrences of that particular wheel position in significant oscillations during a predetermined time period. The ultimate objective of the histogram is to present a picture of the frequency of significant wheel oscillation versus the maximum range of wheel travel for a particular road surface. Therefore the sampled sensor readings are ignored if the movement is not considered significant in revealing true road-caused oscillations of amplitude sufficient to affect ride character. This is accomplished by updating the histogram in response to significant movements away from the base position. The histogram will thus convey information concerning the highest frequency of oscillation having a predetermined minimum amplitude.

At decision point 281, the system determines if the sensor reading is away from the zero or base position ZR. If so, the system proceeds to convert or assign the present sensor value, which is a high resolution number from 0–255 spanning the full range of positions, to one of the 30 ride cells of the histogram and update the histogram. The method of updating the histogram is to increment all cells from the cell after that containing the TRIP level to that containing the present sensor reading unless there is a crossing of the base or zero cell. In the latter case, only the cells from the zero cell to that of the present sensor reading are incremented if movement is positive. If movement is negative only the cells from that after the zero level to that of the present sensor reading are incremented. This process can be illustrated with reference to an example of a typical histogram shown in FIG. 17, in which the 30 cells representing wheel positions or levels are displayed on the horizontal axis and the number of counts or crossings which represents the number stored in each of those cells is shown along the vertical axis. This particular histogram is derived from the curve of level or position versus time shown in FIG. 16, in which the sampled sensor readings which result in an updating of the histogram are shown as dots on the curve. The histogram of FIG. 17 is thus generally characteristic of the road surface traversed by the wheel during the time interval shown in FIG. 16. This example of just over 3 seconds is abbreviated for clarity; a typical sample period would actually be 7-10 seconds.

From step 282 the system proceeds to update the old TRIP value at step 284 by replacing it with the present sensor reading, which becomes the new TRIP value for the next sensor reading. It should be noted that the TRIP value is stored in the higher resolution form of 0-255, although the ride cell number may also be stored for convenience. This ensures higher resolution to more accurately perform the tests required in decision points 281 and 283. Decison point 283 is reached from decision point 281 if movement is not away from the zero reference ZR. The value DIFF is compared to a predetermined hysteresis value HYST. If DIFF is greater, TRIP is updated at 284. However, if TRIP is not greater, TRIP is not updated; and the system proceeds to block 285.

In block 285, the system performs a multitude of tasks relating to the servicing of the valves of variable dampers 8. This involves outputting pulses to the actuator means yet to be described, each pulse causing rotation of the valve means already described by a certain predetermined angle and requiring a certain minimum amount of time for the physical movement thereof. Since this is a timed interrupt, it is convenient to generate the pulses, if the valve has not yet reached its intended position, within this interrupt. The pulses may be issued during selected regular occurrences of the interrupt; and the time between pulses is chosen to ensure sufficient time for each pulse to produce its rotation before the next is issued. In this embodiment, although it may not be necessary in all, the time between pulses may be varied in response to a temperature signal to allow for the temperature dependent viscosity of the fluid in dampers 8. In addition, the pulses may be suppressed altogether if electrical system voltage is sensed to be too low to reliably actuate the valve moving apparatus. A switch within the actuator sends a signal to I/O apparatus 216 in a reference position once each revolution of the actuator, which always turns the same direction. Reindexing routines of standard form are used to reorient the actuator and valve if an error is discovered in the valve positon in response to this position feedback.

From step 285, the program proceeds to decision point 286, in which it is determined whether or not it has been a full one-half second since the last DELTA MPH calculation. If so, the program proceeds to form DELTA MPH in step 287 by saving a value of the difference between the last two consecutive RDSPD periods. From block 287 or, if not one half second, from decision point 286, the program returns to the main loop.

Returning to the MAIN loop in FIG. 13, detection of the RTI flag at decision point 261 results in an advance to step 262 in which the RTI flag is reset and then to decision point 263 in which it is determined if the histogram is valid. An invalid histogram is indicated by a variety of factors which may be indicated by flags or tested for at this point. For example, an indicated roadspeed less than 10 MPH invalidates the histogram, since oscillations during this period cannot be reliably considered to be caused by the road. Further, the value of DELTA MPH is tested for acceleration or deceleration and the histogram is invalidated during these conditions and for a period thereafter so that vertical body movements due to acceleration and deceleration are not interpreted as evidence of road characteristics. The histogram is also invalidated during valve servicing. In general, any detectable activity which might lead to the histogram being significantly corrupted with data not caused by road surface features is a possible candidate for histogram invalidation; and it is the job of the system designer to determine which are to be included. If the histogram is not valid, the program proceeds, in step 269, to reinitialize the histogram by zeroing all cells and initiating a new sample period before returning to step 260.

If the histogram is valid, however, the system proceeds to determine if a ride sample period is complete. The ride sample period comprises a predetermined number of sensor samplings, the number being sufficient to form a representative histogram. If the ride sample period is not complete, the system returns to step 260; but if it is, the system proceeds, in steps 265-268, to derive the next valve position from the histogram.

In step 265, the system determines the largest cell value in the histogram, which here is labelled N1. In the example of FIG. 17, this value is labeled "MAXIMUM COUNTS" and equals 5. In the case of multiple equal maxima as shown, the system picks the closest to the zero level, although the values of all are identical. In step 266 the value N2 is determined by first decrementing each cell by a percentage of N1 rounded to an integer, which is taken to be 1 in the example of FIG. 17. When this is done, it can be seen with reference to FIG. 17 that cells numbered $-11$, $+12$ and $+13$ will be zero. N2 is determined by identifying the main group of contiguous non-zero cells including that containing the maximum number N1 and determining the number of such cells. In the example of FIG. 17, this number is labelled "MAXIMUM RANGE" and equals 22. It may occur that the process will isolate a group of non-zero cells from the main group. It is assumed that the isolated group is due to an anomaly not typical of the general road surface; and it is thus ignored. The two numbers N1 and N2 are, with certain additional filtering, the table lookup numbers.

In step 267, scaling factors and/or lag filter functions are applied to N1 and N2. The scaling factors are stored in tables and are applied in order to adjust for valving nonlinearity. This nonlinearity is the effect contributed by the damping system itself to the histogram, which is supposed to be a picture of the road only. It may be imagined that the histogram of a first damper valving may differ from that of a second damper valving for the same road surface due to the different reaction of the vehicle. The scaling factors are corrective factors based on the present valve position to compensate for this effect. The scaling factors may be different for N1 and N2. The lag filter functions are standard for filtering out sudden changes in readings and are applied at predetermined rates. It should be noted that the scaled and filtered values of N1 and N2 are not necessarily integers.

In step 268, the proper table of damping control numbers (as chosen by the vehicle operator) is selected if a choice is offered and the filtered and scaled values of N1 and N2 are used to enter the table and select the proper damping control number. It has been found in some cases to be necessary for system stability to use a hysteresis technique in this table lookup. In this technique, the boundaries of the lookup parameters which form the rectangular cell in the table containing the damping control number presently being used are expanded somewhat at the expense of neighboring cells so that the lookup numbers must be slightly greater in difference from those last used in order to produce a change in the valve position. Once a change occurs, however, the boundaries of this cell resume their normal size and the boundaries of the new damping control number cell are expanded in a similar fashion, also temporarily. Additionally in step 268, any valve change required on the basis of the table lookup is initiated, the valve change being continued and completed by the INTRPT routine as previously described. Finally, the program proceeds to step 269, in which a new sample period and histogram are initiated as previously described, before the system returns to decision point 261.

Valve Actuator

With particular reference to FIG. 2, a generally cylindrical frame 74 is disposed in the housing 62 adjacent the shaft support 68 with a center web portion 76 thereof separating an upper cylindrical portion 78 from a lower cylindrical portion 80. The lower end of the lower cylindrical portion 80 is received in a corresponding outer groove in the shaft support 68 whereby the shaft support and frame are rigidly connected. The remainder of the volume of the housing 62 above the frame 74 is consumed by a cylindrical electric solenoid winding 82 enclosed in an insulating jacket defining a longitudinal bore 84 aligned on the axis 58. The winding 82 is energizable by the adaptive control through conductors, not shown, extending up through the connector tube 66 to the connector 72. The magnetic field developed upon energization of the winding 82 acts on a plunger 86 in the bore 84 whereby the plunger is stroked vertically from an at-rest position 86' to a retracted position shown in solid lines in FIG. 2.

As seen best in FIGS. 2 and 3, a first support bracket 88 and a second support bracket 90 have flange portions captured between an appropriate shoulder at the open end of upper cylindrical portion 78 of the frame 74 and a rolled over end 92 of the latter and are thereby rigidly attached to the frame. A metallic guide assembly, not shown, provided below the winding 82 guides the plunger 86 through a non-metallic bushing and provides a magnetic flux path from the plunger back to the frame 74. The first bracket 88 has an integral, depending hinge support 94 carrying a hinge pin 96. The second support bracket 90 includes an integral, depending roller support 98 having a U-shaped extremity 100. A pin 102 extends between the legs of the U-shaped extremity 100 and rotatably supports a roller 104. An actuating lever 106 has a pair of webs 108a and 108b interconnecting a pair of opposite sides 110a and 110b of the lever straddling the hinge support 94 of the first support bracket 88. The sides 110a and 110b include appropriate apertures for receipt of the hinge pin 96 whereby the actuating lever 106 is supported on the first bracket for pivotal movement about the pin between an extended position shown in FIG. 2 and a retracted position, not shown, angularly displaced clockwise from the extended position. The web 108a is disposed in a transverse groove 112 in the plunger 86 with the opposite sides 10a and 110b of the lever straddling the plunger and with the web 108b being located below the lower end of the plunger. Accordingly, when the plunger 86 is stroked by the winding 82 from the at-rest to the extended position, the actuating lever 106 is pivoted from the retracted to the extended position.

The opposite sides 110a and 110b of the actuating lever 106 support therebetween another hinge pin 114 on which is pivotally supported a pawl 116 having a forwardly and laterally extending foot portion 118 at one side thereof. A torsion spring 120, coiled around the hinge pin 96, has one leg bearing against the fixed hinge support 94 and the other leg bearing against the pawl 116 so that the actuating lever is urged clockwise, FIG. 2, to the retracted position wherein the laterally extending foot portion 118 engages a depending tab 121 on the roller support 94 which prevents further clockwise movement of the actuating lever.

The actuator 60 further includes an input driver 122 having a disc-shaped head 123, a hub 124 journalled in a bore 125 in the center web portion 76 of the frame 74 whereby the input driver is rotatable about the axis 58, a hex shaft portion 126, and a pilot shaft portion 127. A plurality of circumferential teeth 128 are formed on the head 123 around the outside diameter thereof and a plurality of face teeth 130 are formed in an annular array on the side of the head 123 facing the pawl 116. In the retracted position of the actuating lever 106, the spring 120 biases the foot portion 118 against one of the face teeth 130 on the head 123. When the plunger 86 is stroked by the winding 82 from the at-rest to the retracted position and the actuating lever rocked from the retracted to the extended position, the foot portion 118 of the pawl 116 rotates the input driver 122 until the pawl engages the roller 104. The roller 104 limits movement of the input driver 122 to an angle corresponding generally to the angular spacing between the face teeth 130. When the winding 82 is deenergized after each stroke of the plunger 86, the spring 120 returns the actuating lever 106, the pawl 116, and the plunger to their original retracted and at-rest positions, respectively. A schematically illustrated flexible lever 132 mounted on the center web portion 76 yieldably engages the circumferential teeth 128 on the head 123 to maintain the angular position of the input driver when the solenoid winding 82 is deenergized.

As seen best in FIGS. 2 and 4 through 6, an intermediate driver 138 has a hub 140 pressed on hex shaft portion 126 of the input driver whereby the intermediate driver is supported on and rotatable as a unit with the input driver. The intermediate driver 138 further includes an abutment 142 extending parallel to the axis 58 and three projections 144a, 144b and 144c generally diametrically opposite the abutment. The distal end of the abutment 142 is beveled to define an end face 146. An electrical contact carrier 148 on hex shaft portion 126 is separated from the center web 76 by a washer 149 and is rotatable as a unit with the intermediate driver.

The contact carrier 148 cooperates with a schematically illustrated contact support 150 rigidly attached to the frame 74 through a plurality of contacts, not shown. The inherent resilience of the contacts, together with the resilient force imparted to the input driver 122 by the pawl 116, urges the input and intermediate drivers downward, FIG. 2. Electrical conductors, not shown, extending from the contact support 150 to the connector 72 on the stem portion 50 of the piston rod 30 connect to I/O apparatus 216 and provide a signal to the latter when the input driver is in a predetermined reference angular position.

An output driver 152 has a cylindrical portion 154 journalled in bore 69 of the shaft support6 68 whereby the output driver is supported on the shaft support 68 and the housing 62 for rotation on the axis 58. The output driver further includes a shaft portion 156 and a head 158 integral with the shaft portion. The head 158 has a transverse groove 164, a pair of diametrically opposed upstanding arms 166a and 166b, and a pilot bore 168 which receives the pilot shaft portion 127 of the input driver 122 thereby supporting that end of the input driver on the housing 62. The distal ends of the arms 166a and 166b are beveled at angles corresponding to the angle of beveled end face 146 on the abutment 142 to define end faces 170a and 170b. An inner tube 172 is received over the end of shaft portion 156 of the output driver and abuts a stop ring 174 on the shaft portion, the inner tube being pressed over a serrated section 175 on and rolled into a groove 176 in the shaft portion 156 so that the inner tube 172 is rotatable as a unit with the output driver 152 about the axis 58. The lower end of the inner tube 172 is non-rotatably connected to the rotor 56 on the piston assembly 28 through blade 242 so that selector plate 241 is rotatable as a unit with the output driver and the inner tube. A torsion spring 177 is coiled around the hub 140 of the input driver 138 and has a first end 178 extending radially between the projections 144a and 144b and a second end 180 extending radially into an appropriate receptacle in the head 158 of the output driver 152. The torsion spring is prestressed prior to assembly to bias the intermediate and output drivers 138 and 152, respectively, in opposite directions until end face 170a on arm 166a on the output driver engages end face 146 on abutment 142 on the intermediate driver. The force with which the end face 170a is held against end face 146 is somewhat adjustable depending upon whether the first end 178 of the spring is disposed between projections 144a and 144b or between projections 144b and 144c.

In the embodiment illustrated, the gas pressure within height adjusting portion 10 and the damping capability of damper portion 11 of the variable damper 8 may each be adjustable during vehicle operation for optimum suspension performance. With respect only to damping, the adaptive control receives sensor inputs representative of road conditions and, from the contact support 150, representative of the current damping capability of the damper portion 11 of the variable damper 8. If the present damping capability is not in accordance with the programmed capability for the road condition being encountered by the vehicle, a plurality of electrical pulses are communicated to the winding 82 whereby the plunger is stroked between the at-rest and retracted positions to rotate the input driver 122 in step-wise fashion one tooth at a time. Since the contact carrier 148 rotates with the input driver 122, the plunger 86 continues to stroke until the input from the contact support 150 corresponds to the preprogrammed position of the input driver, whereupon the winding 82 is deenergized. The position of the input driver 122 thus achieved is then maintained by the flexible lever 132 engaging the circumferential teeth 128 on the head 123 of the input driver.

During rotation of the input driver about the axis 58 in step-wise fashion, the intermediate driver 138 likewise rotates through its rigid connection on hex shaft portion 126. Rotation of the intermediate driver is transmitted to the output driver 152 through the first end 178 of spring 177 between the projections 144a and 144b, the main body portion of the spring, and the second end 180 of the spring in the groove 164 in the head 158 of the output driver. Accordingly, as long as rotation of the output driver is unobstructed, the torsion spring 177 holds end face 170a against end face 146 so that the input and output drivers rotate as a unit. As the output driver 152 rotates, the inner tube 172 likewise rotates relative to the outer tube 64 so that selector plate 241 in the piston assembly 28 is rotated in step-wise fashion about the axis 58 though an angle corresponding to the angle of rotation of the input driver 122. The position of the input driver determined by the control 212-216 locates selector plate 241 in the one of its control positions corresponding to the damping capability most suited to the road conditions being encountered by the vehicle.

During jounce and rebound suspension excursions, sharp pressure increases or spikes may occur in the compression and rebound chambers 32 and 34 which can temporarily immobilize selector plate 241 against orifice plate 226 during control input to the winding 82. In that situation, stroking of the plunger 86 continues so that the input driver 122 rotates until the contact support 150 signals the on-board control that the preprogrammed position of the input driver is achieved. However, the inner tube 172, being immobilized, prevents a corresponding rotation of the output driver 152 so that the abutment 142 and end face 146 on the intermediate driver separate from the arm 166a and end face 170a. Consequently the spring 177 is additionally torsionally stressed as the intermediate driver 138 rotates counterclockwise, FIG. 4, relative to the output driver. When the pressure spike which temporarily immobilized selector plate 241 ceases and rotor mobility returns, the torsion spring 177 automatically rotates the output driver relative to the intermediate driver until end face 170a on arm 166a engages end face 146 on the abutment 142 whereupon rotation of the output driver ceases if the intermediate driver is stationary or continues to rotate as a unit with the intermediate driver if rotation of the latter has not ceased. Accordingly, the actuator 60 stores the control input during periods of rotor immobility and then automatically rotates the valve rotor to a desired position when mobility returns. The corresponding bevels on the end faces 170a and 146, preferably about 20 degrees, function to cushion the impact of the output driver on the intermediate drivers when mobility of the former returns. That is, when the end faces 170a and 146 are forced together as spring 177 uncoils, the intermediate and output driver are lifted axially against the resilience of the contacts between the contact support 150 and the contact carrier 148 and the force of pawl 116 on the input driver.

Level Sensor

Figure 8:
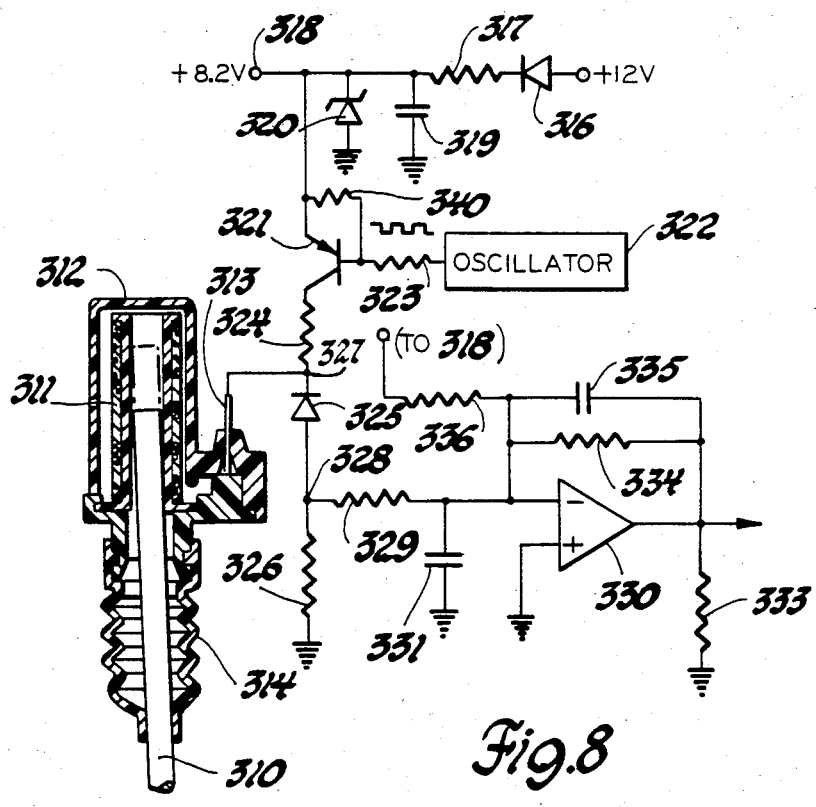
FIG. 8 is a partially cutaway elevational view and accompanying circuit diagram of relative vertical separation sensing apparatus between the sprung and unsprung masses of the vehicle shown in FIG. 7.

Although many analog or digital relative level or position sensors may be adapted for use in the apparatus of this invention, a sensor which has been found to work well is shown in FIG. 8. A rod 310 made of a magnetically responsive material and having one end pivotally attached to one of the sprung or unsprung masses of the vehicle has its other end free to move axially within a cylindrical coil inside a chamber of a sensor housing 312, housing 312 being attached to the other of the sprung and unsprung masses of the vehicle. One end of the coil is grounded to a circuit ground and the other attached to a terminal 313 for connection to an external electronic circuit. A flexible sealing boot 314 closes the open end of sensor housing 312 around rod 310 to prevent the entry of dirt, water and other contaminants therein. Relative axial motion between rod 310 and coil 311 due to relative vertical motion between the sprung and unsprung masses of the motor vehicle causes changes in the inductance of coil 311.

The external circuit, as shown in FIG. 8, includes a voltage regulator comprising a diode 316 having an anode connected to an electric power source at 12 volts such as the vehicle battery and a cathode connected through a resistor 317 to a terminal 318. Terminal 318 is further connected to ground through a capacitor 319 and a parallel zener diode 320. Terminal 318 thus provides a regulated voltage for the emitter of a PNP bipolar transistor 321 having a base connected to the output of a square wave oscillator 322 through a resistor 323 and to the emitter through a biasing resistor 340. The collector of transistor 321 is connected through a resistor 324 to the cathode of a diode 325 hving an anode connected through a resistor 326 to ground. The junction 327 of resistor 324 and diode 325 is connected by terminal 313 to coil 311. Junction 328 of diode 325 and resistor 326 is connected through a resistor 329 to the inverting input of an op amp 330 with a capacitor 331 from said inverting input to ground. The noninverting input of op amp 330 is grounded and the output is connected through a resistor 333 to ground and through a parallel resistor 334 and capacitor 335 to the inverting input. The inverting input is further connected through a resistor 336 to the regulated voltage at terminal 318.

In operation, oscillator 322 produces a square wave output to switch transistor 321 between conducting and nonconducting states at a convenient frequency of, for example, 8 kilohertz. During each conductive state, current flow increases through transistor 321, resistor 324 and coil 311. Diode 325 prevents this conduction from producing any effect at junction 328. When transistor 321 is switched to a nonconducting state, current tends to continue to flow through coil 311; but this current must come through resistor 326 and diode 325. Thus the junction 328 voltage spikes downward below ground and rises in an inverse exponential curve back toward ground as current flow falls off in coil 311. The inductance of coil 311, as determined by the axial position of rod 310, determines the rate at which the voltage rises toward ground at junction 328. The values of the circuit elements are adjusted so that the maximum inductance of coil 311 will still allow the voltage to return to approximate ground level before transistor 321 switches conductive once again. Naturally, lesser inductances corresponding to rod 310 pulled further out of coil 311, will cause the voltage to approach ground at an even faster rate. Op amp 330 and its associated elements act substantially as an integrator to integrate the area under the voltage spikes and generate a positive output voltage which is an analog, with a very slight ripple, of the inductance of coil 311, and therefore of the level of the sprung mass of the vehicle relative to the unsprung mass. This analog voltage may then be converted to a digital signal in I/O apparatus 216.

The embodiments of the invention in which an exclusive property or privilege is claimed are defined as follows:

1. Variable damping apparatus for a wheeled vehicle having sprung and unsprung masses connected thereby, the damping apparatus comprising a housing defining a pair of chambers having a conduit therebetween and containing a non-compressible fluid, means effective to pump said fluid between said chambers through said conduit in response to vertical movement between said sprung and unsprung masses, adjustable valve means in said conduit effective to control the flow of said fluid therethrough and means effective to adjust said valve means to control the ride characteristics of the vehicle, said valve means comprising, in combination:

a stationary plate in said conduit, the stationary plate having a bleed orifice and at least two additional orifices opening axially therethrough, each said additional orifice including a blowoff valve closed at low pressure and opening at a higher pressure and having some blowoff characteristic differing from that of the other;

a rotatable plate having a bleed orifice and an additional orifice opening axially therethrough, the rotatable plate being disposed adjacent the stationary plate so that the orifices of the separate plates are brought into and out of axial communication as the rotatable plate is rotated, the rotatable plate defining a position of full bleed orifice communication with respect to the stationary plate in which fluid communication between the bleed orifices of the rotatable and stationary plates is maximum and a plurality of additional positions with respect to the stationary plate, in each rotational direction from the position of full bleed orifice communication, in which bleed orifice communication between the plates is progressively reduced, the additional orifice of the rotatable plate communicating with one and not the other of the additional orifices of the stationary plate in the position of full bleed orifice communication and with rotation of the the rotatable plate in one direction therefrom and communicating with the other additional orifice of the stationary plate with rotation of the rotatable plate in the opposite direction from the position of full bleed orifice communication; and means effective to couple said valve adjustment means to said rotatable plate to adjust said valve means by rotating the rotatable plate with respect to said stationary plate, whereby more than one set of blowoff characteristics may be chosen for selected degrees of bleed orifice communication in the adjustment of the ride characteristics of the vehicle.

2. Variable damping apparatus for a wheeled vehicle having sprung and unsprung masses connected thereby, the damping apparatus comprising a housing defining a pair of chambers having a conduit therebetween and containing a non-compressible fluid, means effective to pump said fluid between said chambers through said conduit in response to vertical movement between said sprung and unsprung masses, adjustable valve means in said conduit effective to control the flow of said fluid therethrough and means effective to adjust said valve means to control the ride characteristics of the vehicle, said valve means comprising, in combination:

a stationary plate in said conduit, the stationary plate having a bleed orifice, symmetrical about a radial axis, and two additional orifices opening axially therethrough, said additional orifices having different restrictions to fluid flow therethrough and including blowoff valves closed at low pressure and opening at a higher pressure;

a rotatable plate having a bleed orifice and an additional orifice opening axially therethrough, the bleed orifice being substantially similar to the bleed orifice of the stationary plate in size, shape and radial position and the additional orifice having an annular sector shape and being radially positioned similarly to the additonal orifices of the stationry plate, the rotatable plate defining a position of full bleed orifice communication with respect to the stationary plate in which fluid communication between the bleed orifices of the rotatable and stationary plates is maximum and a plurality of additional positions with respect to the stationary plate, in each rotational direction from the position of full bleed orifice communication, in which bleed orifice communication between the plates is progressively reduced, the additional orifice of the rotatable plate communicating with only one of the additional orifices of the stationary plate in the position of full bleed orifice communication and with rotation of the the rotatable plate in one direction therefrom but, with rotation of the rotatable plate in the opposite direction from the position of full bleed orifice communication, communicating less with the one additional orifice of the stationary plate and establishing communication with the other additional orifice of the stationary plate; and means effective to couple said valve adjusnment means to said rotatable plate to adjust said valve means by rotating the rotatable plate with respect to said stationary plate, whereby more than one set of blowoff characteristics may be chosen for selected degrees of bleed orifice communication in the adjustment of the ride characteristics of the vehicle.

3. Variable damping apparatus for a wheeled vehicle having sprung and unsprung masses connected thereby, the damping apparatus comprising a housing defining a pair of chambers having a conduit therebetween and containing a non-compressible fluid, means effective to pump said fluid between said chambers through said conduit in response to vertical movement between said sprung and unsprung masses, adjustable valve means in said conduit effective to control the flow of said fluid therethrough and means effective to adjust said valve means to control the ride characteristics of the vehicle, said valve means comprising, in combination:

a stationary plate in said conduit, the stationary plate having a bleed orifice, symmetrical about a radial axis, and two additional orifices opening axially therethrough, said additional orfices each including a blow off valve closed at low pressure and opening at a higher pressure different from that of the other;

a rotatable plate having a bleed orifice and an additional orifice opening axially therethrough, the bleed orifice being substantially similar to the bleed orifice of the stationary plate in size, shape and radial position and the additional orifice having an annular sector shape and being radially positioned similarly to the additional orifices of the stationary plate, the rotatable plate defining a position of full bleed orifice communication with respect to the stationary plate in which fluid communication between the bleed orifices of the rotatable and stationary plates is maximum and a plurality of additional positions with respect to the stationary plate, in each rotational direction from the position of full bleed orifice communication, in which bleed orifice communication between the plates is progressively reduced, the additional orifice of the rotatable plate communicating with only one of the additional orifices of the stationary plate in the position of full bleed orifice communication and with rotation of the the rotatable plate in one direction therefrom but, with rotation of the rotatable plate in the opposite direction from the position of full bleed orifice communication, communicating less with the one additional orifice of the stationary plate and establishing communication with the other additional orifice of the stationary plate; and means effective to couple said valve adjustment means to said rotatable plate to adjust said valve means by rotating the rotatable plate with respect to said stationary plate, whereby more than one set of blowoff characteristics may be chosen for selected degrees of bleed orifice communication in the adjustment of the ride characteristics of the vehicle.

4. Variable damping apparatus for a wheeled vehicle having sprung and unsprung masses connected thereby, the damping apparatus comprising a housing defining a pair of chambers having a conduit therebetween and containing a non-compressible fluid, means effective to pump said fluid between said chambers through said conduit in response to vertical movement between said sprung and unsprung masses, adjustable valve means in said conduit effective to control the flow of said fluid therethrough and means effective to adjust said valve means to control the ride characteristics of the vehicle, said valve means comprising, in combination:

a stationary plate in said conduit, the stationary plate having a bleed orifice, with a pie shape symmetrical about a radial axis, and two additional orifices, of generally circular shape and differing diameters and positioned radially outward of the bleed orifice, opening axially therethrough, said additional orifices each including a blowoff valve closed at low pressure and opening at a higher pressure;

a rotatable plate having a bleed orifice and an additional orifice opening axially therethrough, the bleed orifice being substantially similar to the bleed orifice of the stationary plate in size, shape and radial position and the additional orifice having an annular sector shape and being radially positioned similarly to the additonal orifices of the stationary plate, the rotatable plate defining a position of full bleed orifice communication with respect to the stationary plate in which fluid communication between the bleed orifices of the rotatable and stationary plates is maximum and a plurality of additional positions with respect to the stationary plate, in each rotational direction from the position of full bleed orifice communication, in which bleed orifice communication between the plates is progrsively reduced, the additional orifice of the rotatable plate communicating with only one of the addditional orifices of the stationary plate in the position of full bleed orifice communication and with rotation of the the rotatable plate in one direction therefrom but, with rotation of the rotatable plate in the opposite direction from the position of full bleed orifice communication, communicating less with the one additional orifice of the stationary plate and establishing communication with the other additional orifice of the stationary plate; and means effective to couple said valve adjustment means to said rotatable plate to adjust said valve means by rotating the rotatable plate with respect to said stationary plate, whereby more than one set of blowoff characteristics may be chosen for selected degrees of bleed orifice communication in the adjustment of the ride characteristics of the vehicle.

5. Variable damping apparatus for a wheeled vehicle having sprung and unsprung masses connected thereby, the damping apparatus comprising a housing defining a pair of chambers having a conduit therebetween and containing a non-compressible fluid, means effective to pump said fluid between said chambers through said conduit in response to vertical movement between said sprung and unsprung masses, adjustable valve means in said conduit effective to control the flow of said fluid therethrough and means effective to adjust said valve means to control the ride characteristics of the vehicle, said valve means comprising, in combination:

a stationary plate in said conduit, the stationary plate having a three bleed orifices and three additional orifices opening axially therethrough, the bleed orifices having identical pie shapes symmetrical about radial axes and equispaced on a common circumference, the additional orifices having generally circular shapes of different diameters and being circumferentially interspersed with said bleed orifices radially outward therefrom, said additional orifices each including a blowoff valve closed at low pressure and opening at a higher pressure;

a rotatable plate having a bleed orifice and an additional orifice opening axially therethrough, the bleed orifice being substantially similar to the bleed orifice of the stationary plate in size, shape and radial position and the additional orifice having an annular sector shape and being radially positioned similarly to the additional orifices of the stationary plate, the rotatable plate defining a position of full bleed orifices communication with respect to the stationary plate in which fluid communication between the bleed orifices of the rotatable and stationary plates is maximum and a plurality of additional positions with respect to the stationary plate, in each rotational direction from the position of full bleed orifice communication, in which bleed orifice communication between the plates is progressively reduced, the additional orifice of the rotatable plate communicating with only one of the additional orifices of the stationary plate in the position of full bleed orifice communication and with rotation of the the rotatable plate in one direction therefrom but, with rotation of the rotatable plate in the opposite direction from the position of full bleed orifice communication, communicating less with the one additional orifice of the stationary plate and establishing communication with the other additonal orifice of the stationary plate; and means effective to couple said valve adjustment means to said rotatable plate to adjust said valve means by rotating the rotatable plate with respect to said stationary plate, whereby more than one set of blowoff characteristics may be chosen for selected degrees of bleed orifice communication in the adjustment of the ride characteristics of the vehicle.

* * * * *